United States Patent [19]

Lee

[11] Patent Number: 5,343,559
[45] Date of Patent: Aug. 30, 1994

[54] MEMORY SYSTEM ADAPTED TO STORE TWO ASSOCIATED SETS OF DATA ITEMS

[75] Inventor: Robert I. Lee, Gatley, England

[73] Assignee: Microcomputer Technical Services Limited, Gatley, United Kingdom

[21] Appl. No.: 679,011

[22] PCT Filed: Nov. 1, 1989

[86] PCT No.: PCT/GB89/01305
§ 371 Date: Jul. 2, 1991
§ 102(e) Date: Jul. 2, 1991

[87] PCT Pub. No.: WO90/05343
PCT Pub. Date: May 17, 1990

[30] Foreign Application Priority Data

Mar. 11, 1990 [GB] United Kingdom ............ 8825780.3

[51] Int. Cl.$^5$ .............................................. G06F 12/02
[52] U.S. Cl. ............................ 395/425; 364/DIG. 1;
364/251.6; 364/254.2; 364/254.9
[58] Field of Search ... 364/200 MS File, 900 MS File;
395/400, 425; 365/189.01, 230.03

[56] References Cited

U.S. PATENT DOCUMENTS

| | | | |
|---|---|---|---|
| 3,916,387 | 10/1975 | Woodrum | 340/172.5 |
| 4,519,035 | 5/1985 | Chamberlain | 395/800 |
| 4,606,002 | 8/1986 | Waisman et al. | 395/600 |
| 4,794,528 | 12/1988 | Hirose et al. | 395/600 |
| 5,072,424 | 12/1991 | Brent et al. | 365/189.01 |

OTHER PUBLICATIONS

"Multiple Generation Text Files Using Overlapping Tree Structures", Burton, et al, *The Computer Journal*, vol. 28, No. 4, 1985, pp. 414–416.

"A Modified List Technique Allowing Binary Search", G. Berman, et al., *Journal of the Association for Computing Machinery*, vol. 21, No. 2, Apr. 1974, pp. 227–232.

"List Search Hardware for Interpretive Software", Altaber, et al., *Fifth Euromicro Symposium on Microprocessing and Microprogramming*, pp. 221–227, 1979.

*Primary Examiner*—Joseph L. Dixon
*Assistant Examiner*—Hiep T. Nguyen
*Attorney, Agent, or Firm*—Spensley Horn Jubas & Lubitz

[57] ABSTRACT

A computer memory system of unlimited size which enables the storage of data organized into a multiplicity of tree structures, each formed from a variable number of linked storage cells. The data contained within one tree structure may be associatively linked to the data contained within another tree structure. When the memory is successfully searched for the data held in the first tree structure then the path through the second, associatively linked, tree structure is obtained, giving access to that associated data. Access to all the data stored in the memory system is by means of a novel relative addressing mechanism which removes the memory size limitations inherent with conventional fixed address bus memory systems, allowing unlimited sizes of this memory system to be constructed.

10 Claims, 8 Drawing Sheets

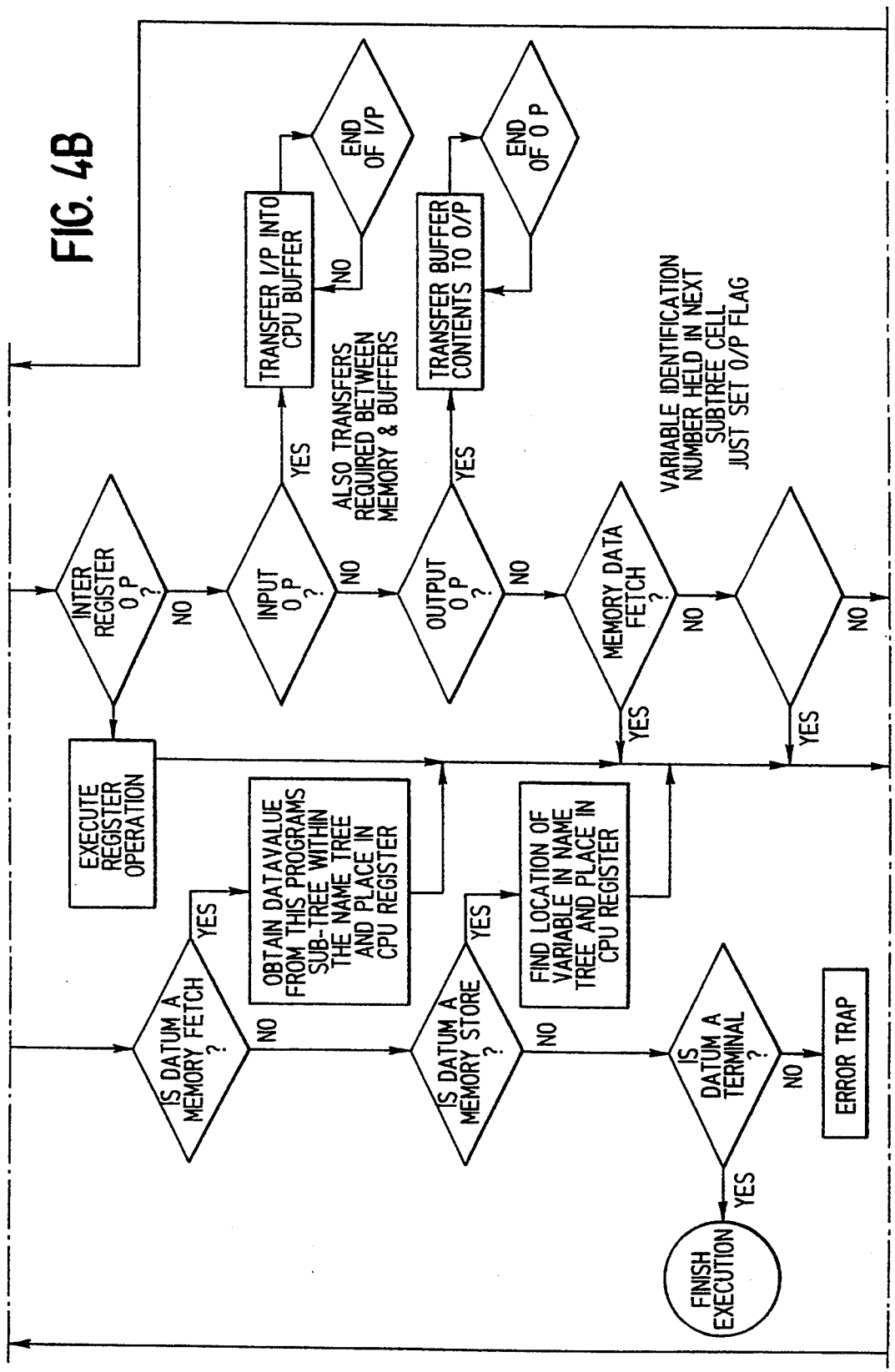

MEMORY SYSTEM ADAPTED TO STORE TWO ASSOCIATED SETS OF DATA ITEMS

The present invention relates to a digital computer.

Conventional digital computers are based on a design attributed to John Von Neumann, which in turn had its foundations in the mathematics of Alan Turing. This design is characterised by a Central Processing Unit (CPU) reading and writing information from and to a Random Access Memory (RAM) and communicating with a number of Input and Output Peripheral Devices (I/O), in order to provide its computing activity.

The RAM memory in a conventional Von Neumann computer consists of an array of storage locations into which can be placed electronic representations of items of information. This information has two forms, referred to as instructions and data. Instructions are encoded items of information which tell the CPU which operations to perform. Data are different items upon which the CPU performs its operations. The CPU obtains and executes a succession of instructions which it reads from the RAM in a sequential manner. This sequence of instructions is called the Computer Program. During execution of the instructions that form a program, data is read and written from and to the RAM and from and to the I/O devices by the CPU. The size and scope of programs that can be processed by a CPU can be very large, even for a CPU with only a limited repertoire of instructions. This is because the sequence of instructions that make up a program is limited only by the ingenuity of the person who creates the program (the Programmer), and the number of instruction and data items that can be accommodated in the RAM.

The essential characteristic of RAM memory is the presentation of an absolute address to the RAM, the absolute address identifying a single memory location or cell in which instructions or data are stored. When an absolute address is presented to RAM, the data or instructions stored at that location are read out (usually to the CPU).

Both the address and the data or instructions are represented in a binary form in the digital computer. Typically the data comprises 4, 8, 16 or 32 bits, but essentially any number of bits could be used. From a practical point of view all RAM data and instructions are of the same fixed number of bits because the CPU contains registers of binary lengths that are intimately related to the RAM data and instructions being accessed by the CPU. In particular the fixed length of the CPU's address register (which is used to address the RAM) limits the number of RAM locations that can be accessed directly by the CPU. For example, a 16 bit address register can directly access up to 65,526 separate RAM locations.

The binary value contained in the CPU's address register is conducted to the RAM via a set of conductors called the address bus. All Von Neumann computers require this address bus and are subject to the address range limitations imposed by its fixed size.

An alternative form of memory is known as Content Addressable Memory (CAM). CAM memory relies upon an alternative strategy to the storage and retrieval of data, and can be considered as an inverse of random access memory. The essential characteristic of CAM memory is that the memory is presented with an item of data and the address at which the item is found is returned. (In practice the returned item is usually some logical manipulation of this physical address.) The range limitations referred to above still apply however. It should be noted that CAM storage is sometimes also referred to as associative storage, although the term "associative" is used in a different sense hereinafter.

Various elaborations of the above approaches to the storage and retrieval of data have been proposed. For example, it is known to store in one memory location an instruction to jump to another location at which a further required instruction or datum is stored. The jump instruction is in terms of "go to the location which is a specified number different from the absolute address of the current location". This location cannot be truly described as a "relative" address as, although it identifies the next location to be accessed in terms of the position of that location relative to the current location, this "relative" address is no more than a convenient way of identifying the "absolute" address of the next location to be accessed. It is still necessary to provide an address bus to provide the absolute address of the new location with the inherent range limitations mentioned above.

A still further alternative approach is described in a thesis entitled "A model for computer aided programming" by Robert Ian Lee, Department of Computing and Control, Imperial College, London which is available to the public on the shelves of Imperial College. This thesis describes a conventional digital computer running a program that relies upon associative data storage techniques. Data is stored in a binary tree structure, each node of the tree providing the origin for two new tree branches. The trees are constructed from storage cells each of which contains three compartments into which data items are placed. Each cell has a unique address (the absolute address). The first compartment contains the data item to be stored, and the next two compartments contain the absolute addresses of the two adjacent cells in the tree located on the two branches.

With the described arrangement, two similar but not identical sets of data items can be efficiently stored, common items of data occupying only one storage cell. For example, the words FORTRAN, FORMAT and FORMULA can be stored in only thirteen cells as follows

```
F O R T R A N
      M A T
      U L A
```

In addition however, each of the three paths through the tree can be terminated by a terminus cell in which can be stored an absolute address pointer to a set of data required to be used only when that particular terminus cell is accessed. Thus if the tree structure is searched for the word FORTRAN, the unique address pointer is accessed. That address pointer can be used to access data or instructions associated with the word FORTRAN. Thus this arrangement provides a true associative storage system in which data presented to the memory causes its associated data to be read out. This is to be contrasted with CAM storage, which as mentioned above is sometimes referred to as associative storage, in which an item of data is presented and the address is returned. Unfortunately, the true associative storage system mentioned above is still constrained by the use of absolute addresses and the address range limitations mentioned above still apply.

It is an object of the present invention to provide a method and apparatus for storing associated data items which obviate or mitigate the problems outlined above.

According to the present invention, there is provided a method for storing two associated sets of data items, wherein each set is stored in a respective series of memory cells each of which cells stores one data item from the set and each but the last in the series of which cells is allocated a relative address from that cell to the cell storing the next data item in the set, the last cell in the series being allocated the relative address from that cell of at least one terminus cell storing data items which in the case of at least one of the series identify the location of the first cell of the other series of cells and the relative addresses from that first cell to the remainder of the other series of cells.

The present invention also provides a digital computer comprising a memory system adapted to store two associated sets of data items, wherein the memory system comprises an array of memory cells each of which is adapted to store one data item, means for storing each set in a respective series of memory cells such that each but the last in the series of cells stores a respective data item and allocates the relative address from that cell to the cell storing the next data item In the set, means for storing in the last cell in the series the last data item in the set and allocating the relative address of at least one terminus cell, means for storing in said at least one terminus cell of at least. one series data items identifying the location of the first cell of the other series of cells and the relative addresses from that first cell of the remainder of the other series of cells, means for presenting to the memory system one of the two sets, means for reading out from said at least one terminus cell of the presented set the data items stored therein, and means for reading out the data items making up the said other set from the cells identified by the data items read out from said at least one terminus cell.

Preferably each cell is arranged to store at least two relative addresses such that each cell can store a data item relating to at least two data sets, the storage location of the next item in each set being identified by a respective relative address.

For example, if we assume a two dimensional array of memory cells each of which is capable of storing two relative addresses, each cell has eight immediate neighhours any two of which can be identified by respective relative addresses. If an item of data (the nth item in a set) is written to any particular vacant cell, the preceding data item in the set (the (n−1) item) occupying one of the eight neighbouring cells, there are seven available neighbouring cells to which the next item of data (the (n+1) item) can be written. The system can be arranged to write the (n+1) item to any vacant one of the adjacent cells. If another set of data items having the same values for the first n items but a different (n+1) item is to be stored, the (n+1) item of the other set can be written to one of the remaining six adjacent vacant cells. The paths through the array of cells of the two sets can then be distinguished by reference to the different relative addresses stored in the cell storing the common nth data item. Each relative address can be fully described by only three binary digits, one relative address being designated the "first" or "right" link relative address and the other the "second" or "left" link relative address. Similarly, if each relative address is described by five bits then the "first" and "second" addresses can be anywhere within the 23 "nearest neighbour" locations. Still further expansions by using more than five relative address bits are of course possible.

The paths of the various data sets can be fully identified by strings of binary digits. It is also possible to in effect "jump" over cells occupied by data items not relevant to a particular set. For example, assuming a single starting point (or root) cell for all sets, when it is desired to store a fresh set, the first data item in the set to be stored is compared to the data item in the root cell. If identity is found, the path description "O" is allocated to the first data item. The system then compares the data item stored in the cell identified by the first relative address with the second data item of the set to be stored. If identity is again found, then again the path description "O" is allocated to the relevant data item. The path description of the first two data items is thus "OO". If identity is not found, the system looks to the second relative address and compares the second data item with the data stored in the cell identified by the second relative address. If identity is found, the path description of the first two data items is "010". If identity is not found, the system looks to the second relative address of the second cell in which identity has not been found, and so on. If in tree building mode, if no identity can be found the relevant data items are written to relevant cells located by the same logical progression through the cell array. A very high density of data storage can thus be achieved without compromising the unique path description for each set of data items. Each path can then be followed when reading a stored set of data items to locate the relevant terminus cell and derive therefrom the path description of the associated set.

It is important to appreciate the implications of this approach to data storage. The items of data referred to have not been constrained in any way. Either or both the associated sets of data items may be considered to be either single Datums of information or extensive sets of such single Datums. Nor is the organisation of these items constrained in any way. They are not required to be stored locally to the other items in a set (although there may be some practical advantages for so storing them).

Another implication is that the link which associates the two sets is not predetermined. It could be a physical link (i.e. a form of address bus) or it could be a nonphysical link (i.e. some form of logical link). In addition, this link can be considered to be either unidirectional or bidirectional, each varient giving particular characteristics to the resulting memory. The most flexible form of the system is one that has bidirectional logical links.

The use of logical links for associating together the two sets implies that one set contains within itself the information necessary to link it to the other after appropriate logical processing, and vice versa.

Since the sets may be stored at physically remote locations, some from of traversing mechanism must be provided within the memory system. During such traverses of the memory, time will be taken up simply by moving through the memory from the initial data item to its associated data item, and without any useful work being done until the destination item is reached. The system will therefore have a variable access time, dependant upon where the associated data items are located.

An important implication of this system is that access to the two sets is obtained without the use of the absolute address bus mechanisms found in RAM and CAM memory systems. The associative memory only requires a data bus to connect it to the CPU. Theoretically therefore, the CPU can access an infinitely large array of associative memory cells entirely through the data bus, and such a memory can hold an infinite quantity of directly accessible Instructions and Data, because it is not constrained by any CPU address bus limitations. A simplistic definition of such an associative memory system is therefore that "there is no conventional address bus".

The associative memory system of the invention requires that in order to obtain the information item represented by one set (set 2) the memory must first be presented with the associated set (set 1). This can be provided by means of a variety of simple binary or higher order tree structures. Consider the following:

```
A -- B -- C -- D -- E -- *1
:    :    :
:    :    v
:    :    F -- G -- H -- *2
:    v
:    I -- J -- K -- *3
:
v
L -- M -- N -- O -- P -- *4
```

The above binary tree structure shows the storage of some set 1 data items (A to P) and their associated set 2 items (1 to 4). In contrast to the seven neighbours of the previously described example, this simple arrangement provides only two possible neighbours for each storage location (cell). These neighbours are considered as a Right direction neighbour and a Down direction neighbour (pointed to by the Right Link and the Left Link respectively.) This binary tree uses the rule that if the item already stored at a location is the one required then one looks for the next item by moving via the Right Link. If the stored item is not the one required then one moves along the Left Link and tries again. If the required item is still not found after traversing all the occupied Left Links then the new item is added to the tree at the next free Left Link, and all subsequent items are stored on the Right Links from this location. When all items have been found or added then a Terminus is created on the next free Right Link (shown by the * characters) and the associated set 2 item is then stored. The above simple tree shows the storage of the set 1 character sequences ABCDE, ABCFGH, ABIJK and ALMNOP and their associated set 2 items 1, 2, 3 and 4 respectively.

The path through the tree which must be followed to obtain a particular set 2 item can be described by a simple bit sequence if as in the above example the Right Link is referred to as a 0 and the Left Link as a 1. Now set 2 item 1 is obtained by the sequence 00000 starting from the Tree Root defined by the character A. Similarly set 2 item 2 has the sequence 0001000, item 3 the sequence 001000 and item 4 the sequence 0100000, again all starting from the Tree Root A. In general any route through the tree can be described by a unique bit sequence providing both the starting position and the length of the bit sequence are also known. In addition, all of the set 2 items within the tree can themselves be stored as a separate tree structure and be pointed at by appropriate bit sequences located at the terminus* locations in the set 1 tree. This provides a method for storing separately all the set 1 items and all the set 2 items (each as tree structures) and for associating any set 2 tree sub-structure with any set 1 tree sub-structure by means of a bit sequence of known length and starting position, located at the correct terminus in the set 1 tree. Similarly a bit sequence located at the correct terminus in the set 2 tree can associatively point to a set 1 tree sub-structure.

This form of binary tree can be used to store many different types of data. Each data type can be constructed into a separate binary tree and associations that link together the different items within the trees can be provided by appropriate sequences of bits located at the terminals of the trees.

An important characteristic of the above type of tree structure is that when storing a new set of data items within an existing tree then, whilst a match is found between the new set and the existing tree structure, these matching items need not be stored again. The storage of new items is required only after all the occupied Left Links have been examined at a particular place in the tree and no match has been found. Then the unmatched item is stored followed by all the remaining items in the new set. This can considerably reduce the storage space requirements, particularly for data sets that differ by only a small but significant extent from each other.

Thus, the links associating set 1 and set 2 items in this truly associative memory are provided by properly constructed bit sequences (hereafter referred to as pointer strings) and the set 1 and set 2 information items are stored as separate tree structures which may be located remotely from each other. A plurality of such tree structures and a plurality of associative pointer strings may be provided.

This process of accessing sequences of Right linked and Left linked cells by the CPU, traces paths through the tree structures stored in the memory cells. The CPU is required to do this either to find a match between some input data (say a program name) and the existing tree data, or to trace the route described by a pointer string (say a program instruction sequence) previously obtained from a tree search operation. That is, the CPU either matches data items in order to find pointer strings or it traces pointer strings in order to find data items, depending on which part of its processing task it is carrying out at a particular moment.

At every location (cell) within the associative memory, each storage cell may be capable of holding a number of different pieces of information simultaneously. These are an item of data (i.e. Instruction to be executed or Data to be processed), a Right Link, a Left Link and a Status Code (described in more detail below). In theory both the Right Link and the Left Link can be specified by a single bit, indicating the free or occupied status of the appropriate link, assuming that the relative addresses of the cells pointed to by the Right and Left links are predetermined. As described above however a more flexible system can be provided in which the Right and Left links are allocated as the tree structure is being built up. Consider the following small associative memory storage array:

```
      . . . . . . . . . . . . . .
      :     :  1  :  2  :
      . . . . . . . . . . . . . .
      :  7  :  D  :  3  :
      . . . . . . . . . . . . . .
      :  6  :  5  :  4  :
      . . . . . . . . . . . . . .
```

This array shows nine storage cells. For the cell marked with the D character there are eight neighbouring cells, marked 1 to 7 and blank. If the D cell represents an item within a tree then its preceding tree item is considered to exist where the blank cell is shown. The D cell's Right and Left Links can be assigned any values appropriate to respective ones of the remaining seven cells. Thus the D cell can be said to have seven degrees of freedom. This gives a requirement for the Right and Left links each to be represented by a three bit binary code. A link value of 0 is used to indicate that the link is unoccupied (i.e. free). For an array of cells extending indefinitely in both the horizontal and vertical directions long sequences of cells can be linked together to form the tree structures, where nominally the Right links have a general North-West to South-East progression and the Left links have a general North-East to South-West progression.

For practical reasons, with all types of memory, it is significantly more convenient to have datums that are logically adjacent within a data structure to also be physically adjacent within the memory; rather than having them located remotely from each other. However, when tree structures are considered it is not easy to provide this proximity for both the right linked and the left linked datums in RAM or CAM memory, particularly for more than trivial numbers of datums. With the associative memory structure a high degree of datum proximity can be provided, even for large tree structures. This is made possible by the absence of a conventional memory access address bus.

The simplest associative memory structure consists of a two dimensional array of storage locations, organised like the squares on a sheet of graph paper. Binary tree structures are created by linking together cells to provide a structure that bears a close resemblance to the graphical representation of that binary tree. Other higher dimensioned trees can also be created in a similar way, for example a six-fold branching tree can be provided by a three dimensional array of storage cells, and so on for higher dimensions. Since the two dimensional case is the simplest to describe this is the one that this document will mainly consider.

It should be noted that in order to progress from one storage cell to the next within the tree structure, normally only a three bit code needs to be obtained. Whilst this may be considered to be the "address" of the next cell it is not a conventional "absolute" address, being instead only the "relative address" from one cell to the next. The CPU is not required to generate an absolute address but only to instruct the memory's electronics to move by a single step in either the horizontal direction, the vertical direction, or both, as specified by the three bit link code. Consider the following memory array and its supporting registers:

```
                                        X Direction Register
         . . . . . . . . . .
       :           :         . . . . . . . . . . . . . . . . . . . . . . . . . . . . . . . . . . . . . . . . . .
       :  C P U  :   :    :    :    :    :  X  :    :    :    :    :    :    :
       :           :         . . . . . . . . . . . . . . . . . . . . . . . . . . . . . . . . . . . . . . . . . .
         . . . . . . . . . .                :
         . . . . .           . . . . . . . . . . . . . . . . . . . . . . . . . . . . . . . . . . . . . . . . . .
     Y :      :   :    :    :    :    :    :    :    :    :    :    :    :
         . . . . .
     D :      :   :    :    :    :    :    :    :    :    :    :    :    :
     i   . . . . .
     r : Y  . . . : . . . : . . . : . . . : . . . : . . . D :    :    :    :    :    :
     e   . . . . .
     c :      :   :    :    :    :    :    :    :    :    :    :    :    :
     t   . . . . .
     i :      :   :    :    :    Memory Array      :    :    :    :    :
     o   . . . . .
     n :      :   :    :    :    :    :    :    :    :    :    :    :    :
         . . . . .
     R :      :   :    :    :    :    :    :    :    :    :    :    :    :
     e   . . . . .
     g :      :   :    :    :    :    :    :    :    :    :    :    :    :
     i   . . . . .
     s :      :   :    :    :    :    :    :    :    :    :    :    :    :
     t   . . . . .
     e :      :   :
     r
```

In the above arrangement the CPU services two Memory Access Registers which collectively define the memory location to be accessed. A single active bit in a particular position in the X Direction Register and a single active bit in a particular position in the Y Direction Register define (at their intersection within the memory array) the storage cell marked D required by the CPU. When the CPU reads the memory then both the data and the additional parametric information held at this location are presented to the CPU. Within the parametric information lies the two three bit link codes for the Right and Left links to the next items within the tree (of which the D cell is also a part) and the cells Status Code.

In order to access the next required memory location the CPU determines whether the Right Link or the Left Link is to be traversed. It then shifts the active bit forwards or backwards by a single position in either the X Direction Register or the Y Direction Register or both, in whatever combination is required by the link code value it is using, to take it to the next required location. In this manner the CPU is able to access long sequences of items forming complex paths through the memory.

When the end of the memory is reached then a number of strategies are possible. For example, the Direction Shift Registers can be made to "wrap around" and so start again at the beginning, or the memory can be extended by adding further rows and columns of storage cells (and also extending the X and Y direction shift registers in order to access these additional memory cells). It should be noted that extending the memory array in this manner can continue to an indefinite extent, which is not possible with a conventional Von Neumann computer. The maximum possible size of the memory is only limited by the timing and drive characteristics of the electronic devices being used. By re-timing and buffering of the signals when they get close to the limits of the electronics being used then even these limits can be overcome.

The first cell in any tree is referred to as the tree root and has the special significance of being the entry point for all items held within that tree. Thus to process a particular program tree sub-structure the required tree root is first accessed and then the tree itself is traversed using the pointer string, (without processing the item found), until the required sub-structure is reached. Then the sub-structure identified by the pointer string is traversed and its Instructions and Data are processed. The pointer string therefore contains the tree root code and two bit sequences, (each with a length specification), one sequence for the route from the tree root to the required sub-structure and the other to traverse the sub-structure. The tree roots are located in the memory array either on the topmost row or the leftmost column of memory cells, or both simultaneously. These locations are readily accessible from all parts of the memory array.

Thus, the memory system is used for storing multiple tree structures containing Instructions and Data, and the CPU is provided with the means to construct, traverse, analyse and process these tree structures. Programs are held in trees and an associated Name Directory tree is used to access these programs, by first presenting the program name to the Name Directory tree and obtaining a pointer string to the programs tree sub-structure. This is then executed by processing the sequence of Instructions and Data contained in that program tree sub-structure.

The tracing of the route described by a pointer string, and the execution of the instructions and data located on that route, is similar in its overall effects to the sequential processing of instructions and data that is to be found in a conventional Von Neumann computer.

The memory searching activity, which always precedes a tracing activity, is also found in conventional Von Neumann computers. Its nearest equivalent is the process of searching for the location of a particular program in RAM memory from a directory of the memory addresses for a number of programs held in RAM or CAM memory.

There are a number of algorithms available to ensure that when the memory array contains a number of separate trees, then the limbs of the separate trees can pass through each other without significant interference. The most efficient algorithm for ensuring this is one which takes account of the average length of the limbs in a tree whenever new limbs are being added. Unfortunately, however, such information may not always be available, particularly during the early stages of tree construction. Therefore, at least initially, the simplest strategy for keeping the trees a sufficient distance apart to avoid inter-tree interference is likely to be the most effective. As the memory becomes more crowded then statistical information about the trees will be known (or can be found) and then a more efficient algorithm can be implemented.

The topmost row and the leftmost column of the memory array are made accessible from anywhere within the memory array by providing the CPU with the means for resetting the memory access shift registers to their first position. This means that in order to move to the topmost row, the Y Direction Register is reset, and to move to the leftmost column then the X Direction Register is reset. Similar arrangements can be provided for memory arrays with more than two dimensions.

In practice both of the shift registers are reset and then the required one is advanced to a position defined by the count value which forms part of the root code held in the pointer string. Having reached the root it is then necessary to traverse the tree to the starting point of the sub-tree of interest.

It is a characteristic of the system that moving from one sub-tree to another (i.e. jumping) is carried out in this rather circuitous manner. This can be contrasted with the very rapid processing of a jump instruction in a conventional computer, where the jump is executed by simply changing the contents of the CPU's Address Register. However there are several other features of the system which compensate for this slow Jump instruction execution and which result in an acceptable computing speed being achieved overall.

The first feature is that in practice the memory array may be provided with a number of the memory access shift registers, which permit several tree sub-structures to be undergoing processing simultaneously, with the CPU switching instantly between the sub-structures as required. This provides a very powerful facility that can be used either for processing a single complex program, or for Multi-Tasking several different programs or for giving several CPU's simultaneous access to a common associative memory. Any or all of these uses of this feature can significantly increase the computing power of the basic system.

The second feature is that in a conventional computer a random list of Data containing N separate items requires, on average, N/2 memory access operations to find a particular item. With the tree structured data form of the associative memory system, using an associative binary tree to store the random list, then as each level of the tree is traversed the size of the list remaining to be searched is halved. Thus any item in the list can be found with no more than approximately "log to the base 2 of N" number of access operations. The larger the list then the greater is the comparative benefit obtained. Even quicker list searching is possible when higher order trees are used rather than binary trees.

A third feature is that, whilst creating a tree sub-structure in the associative memory, the CPU only stores those items that are not already present in the tree being processed. This is a secondary or implicit form of associative storage provided by the tree structure described above, which is not to be confused with the primary or explicit associations created between the different tree sub-structures by means of the pointer strings. This results in a considerable compression of the memory space required for storing large quantities of Instructions and/or Data.

The tree root for trees such as the Name Directory tree are preferably located at pre-defined locations (on the topmost row or the leftmost column), so that the CPU can begin its search activity rapidly by directly accessing the correct tree root location in the memory. The tree roots for the other trees in the memory can be more dynamically located (preferably again along the topmost row or leftmost column), since these trees are normally only accessed via pointer strings which also contain the definition of the location of the tree root required.

Another feature compensating for relatively slow jump instruction execution is that the very large size of the directly accessible memory space provided by the associative memory allows for more Instructions and Data to be processed directly by the CPU than is possible in the limited address space of a conventional computer. In the conventional computer, once the RAM is full of information, then any extra Instructions and Data must be obtained from an I/O peripheral called a Backing Store, (e.g. a disc drive) and written into the RAM in place of the existing information. The mechanical requirements of these backing stores makes them very slow relative to the RAM memory, and so considerable time is used up when they have to be used.

Possibly one of the most significant features of the associative proceesing computer is that, because the memory system cannot be addressed in a conventional way, the information held within the memory must be stored and accessed by a scheme that is orientated around "named structures", "route codes" and "associative storage" strategies. Since the CPU is the device that performs these unconventional activities then it too is unconventional. In particular the CPU must be provided with the means for traversing the trees to an indefinite extent whilst attempting to find a particular item of information held in a CPU register. If the item is not found then it can be stored by Implicit Association at the appropriate tree location. Whenever an item of information is found or stored then the CPU has to create the pointer string from the tree root to the item as it traverses the tree. In practice the CPU can maintain such pointer strings for each tree sub-structure that it is currently involved with. For each of these concurrent pointer strings the CPU is provided with a set of registers in which the pointer strings are created and used.

These tree orientated activities are carried out by means of Microcode Sequences that form a part the CPU and which are similar in operation to those found in a conventional computer. This microcode also provides for the execution of the instructions in the CPU's repertoire. These include a conventional set of Arithmetic, Logical and I/O Communications instructions, together with those special instructions required for the different modes of accessing of the associative memory array.

The CPU has two distinct sets of registers to enable it to carry out its operations. There is one set of fixed length dedicated registers whose operations are directly controlled by the microcode, and there is another larger set which is treated as a local RAM like memory and which is accessed both directly and indirectly by the microcode. This RAM like array of registers is used dynamically by the CPU to create, hold and process all variable length register items required during the CPU's activities (e.g. the pointer strings). These registers, the microcode and the control circuitry for manipulating them, and for controlling the associative memory array and the I/O peripherals, form the associative processing computer's CPU.

In all respects this new type of CPU retains all the essential features required of Alan Turings Finite State Automata mathematics, and indeed it merely implements a different interpretation of these requirements from that proposed by John Von Neumann.

There are no insurmountable difficulties resulting from writing computer programs in a "named structure" manner. The Forth programming language already provides precisely this form of programming on conventional Von Neumann computers. In addition the Forth programming language also has "user extensible" facilities, meaning that new language fetures can be created by the programmer in terms of the existing language features. This can be considered to be logically similar to the feature in the associative processing computer by which the new tree structures are created by reference to the existing structures in the tree.

By its nature the associative processing computer requires that its programs are initially input in a name orientated form, that is, all references to a program's variables and sub-programs (e.g. subroutines) are initially made by the names that the programmer gives them. These names are constructed into the Names Director tree and given terminii that hold either values or pointer strings as appropriate. The program's name references are replaced by pointer strings to the appropriate parts of the Names Directory tree as the programs sub-tree is being formed. This process effectively removes the programmer-specific characteristics from the program and creates instead a universal form of that program.

This feature of removing the programmers names from a program is also found in conventional computers, but implemented somewhat differently than in the associative processing computer. However, these details apart, it is believed that this new computer can be used for the processing of all the types of programs that a conventional Von Neumann computer can process. It can also do things that a conventional computer cannot do.

The associative storage of a program's Instructions and Data using the universal form provides a very powerful facility that allows the associative processing computer to "learn by example". That is, if two separate sequences of information are input such that the second sequence implements the first sequence (e.g. the first is an example problem and the second a program to solve that problem) then the two sequences may be linked together by explicit association. However, because the same names will have been used in both sequences, and because both of the sequences are converted to the universal form, it becomes possible to have another input of the first sequence, (but with different names) implemented by the pre-existing second sequence tree sub-structure, but using the names in the new first sequence. In this way the computer can be said to have "learned by example".

One example of this facility is the conversion of spoken speech into printed text. For this example the first series of strings of information is the digitised form of individual spoken words. The second series of strings is the same words in their printable form (i.e. consisting of their ASCII characters). The individual words that are input in the first series are associated with the printable forms of these words in the second series such that when these words are later spoken again, in any part or order, then their associated printable forms are printed out.

The large size and associative nature of the memory can now be used for storing the same spoken words in the first series for a large number of different voices and accents, associating all of these new voices with the same second series of printable forms of these words. When a sufficient number of different voices have been stored associatively then the computer will have "learned" to translate the words of voices which have not previously been processed. This is because when the first series tree structures are sufficiently large that they hold many of the forms of the digitised spoken words that are normally encountered in human speech, then each word of a new voice will probably be found somewhere pre-existing on the tree.

In order to successfully store the voices of several different people on a common associative tree structure, it is first necessary to pre-process the information of each word spoken by each voice such that those features that are common within a word appear at the beginning of the binary descriptor, and that all the variations appear at the end. This ensures that the same words are placed in the same sub-trees in an efficient manner, which provides for efficient searching later. The raw data required for this pre-processing can be provided by a spectral analysis of the tone qualities within the burst of sound that makes up the spoken word.

Such an intelligent speech system would first need to be educated to "understand" the voice of its user. This would be done by getting the operator to read a pre-prepared text aloud whilst the computer digitises and records the speech, word by word. The computer would then build those speech samples into the input data tree and link up the associations with the output text word tree. The computer, once taught the characteristics of the operators voice for this vocabulary of words, can then perform a free format speech-to-text service for that operator. Thus, when a sufficient number of different operators voice characteristics have been stored, it will become possible for the computer to respond to people who have not been through the "educating process", simply because their voices are sufficiently similar to parts of the data already stored in the system.

The degree of machine intelligence shown in this example is potentially far beyond what has been achieved with conventional Von Neumann computers. It is unlikely that conventional computers can ever be developed to achieve a similar level of performance at an acceptable cost. There are many other application areas for the Associative Processor, all of them characterised by the need for levels of machine intelligence that cannot yet be provided by conventional computers.

Many other examples of this "learning by example" mechanism are possible, from Vision Processing and Expert Systems etc. to other more difficult Artificial Intelligence applications. These applications are all implemented by associating an input sequence with an output process, using the universal form mechanisms in the manner described above.

In creating the universal form of a program it is recognised that all conventional computer programs consists of sequences of statements. Each statement consists of one or more instructions which perform operations upon one or more data items. The instructions, whether they are machine codes or higher level functions, are all ultimately expressed in binary (machine code) form when they are executed. The data items also consist of a variety of types, but they too are ultimately expressed in binary form at execution time. This is a fundamental characteristic of the digital computer.

The conventional computer can only distinguish between the binary form of an instruction and of a datum by keeping a strict record of the instructions it is executing. If the instruction execution sequence ever gets out of step, such that the CPU treats a datum as an instruction, then the program execution becomes fatally flawed. With the tree structure approach in the associative processing computer, instructions and data have fundamentally different forms. The data values reside on the Name Directory tree (or similar) whilst the instruction sequences reside on a separate Program tree (or trees). This provides for a very robust form of program execution, since at all times the CPU can determine whether an accessed item is an instruction or datum, and take corrective action if an error is found.

It is this feature of separately storing the data items and the instructions that provides the means for creating the universal form of a program in the assocaitve processing computer. All of the data items in a program are removed from the sequence of statements and replaced by references to the library of named variables for that program, which is held elsewhere (usually on the Name Directory tree). These references are systematically created by the CPU during the tree storage process. The resulting sequence of statements that make up the program will thus now consist entirely of instructions and standardised datum pointers. This is what is referred to above as the universal form of the program.

Once the program's instruction sequences are stored, and its appropriate library of named variables sub-tree is found, then that program can be executed. If a different, but similarly structured variable library sub-tree is used, instead of the original one, then that program can now be executed as part of some other, previously unconnected, program sequence. In this way logically common sequences of instructions can become part of several separate programs simultaneously.

One benefit of having this universal form for the sequences of program statements, is that the similarities can be identified between the existing tree stored statements and the newly input statements, even when the new and the old have completely different origins. This allows associations to be made which would not otherwise be possible, and it provides for a compact and efficent storage of program statements.

As mentioned above, as well as the Right Link and Left Link values held with the Instruction or Data items, a Status Code field may be provided in every memory cell.

The Status Code is a simple binary descriptor of the type of information being held in the information field of the memory cell. For the tree structures the code allocations may be arbitrarily assigned as follows:

| Status Code | Code Meaning |
|---|---|
| 0 | Cell Unoccupied |
| 1 | Instruction item |
| 2 | Data item |
| 3 | Terminus cell |

These code meanings are obvious. They are used by the CPU to ensure that only the correct type of information is processed during tree searching activity, and to continuously validate all tree processing activities.

Once a Terminus cell is encountered then the Status Codes are interpreted differently, with new arbitrary assignments as follows:

| Status Code | Code Meaning |
|---|---|
| 0 | Usage Count |
| 1 | Root Code |
| 2 | Length Count |
| 3 | Route code |

The Usage Count is used to record the number of times that this tree sub-structure has been actively processed. This is an optional feature of the associative processing computer which is of particular value when processing certain types of Artificial Intelligence application. It allows for retrospective analysis of the trees structures to be carried out. For example if the trees are reconstructed on the basis of the most used structures first and the least used last, then the new tree that results can be traversed more efficiently than the original one. The remaining code meanings are obvious.

In the case of the Terminus cells in the Name Directory trees the Status Code is used to define the type of Value that each variable name possesses. These new arbitrary assignments may be as follows:

| Status Code | Code Meaning |
|---|---|
| 0 | Pointer Code |
| 1 | Integer Value |
| 2 | Real Value |
| 3 | Text Character |

The Pointer Code referred to above is used to indicate that this tree entry is a Jump name (e.g. subroutine name) and that the Terminus cells contain the Pointer String to the sub-structure to be jumped to. The remaining Terminus cell code meanings are obvious.

The above Status Code assignments can be encoded into two bits, but other forms using more bits are also possible. Other assignments of the Status Code can also be made for the other types of tree being held in the associative memory, providing that in each case the CPU has the means for correctly interpreting and acting upon them.

Thus, each memory cell contains the Instruction (or Datum), the Right Link and Left Link values and the Status Code field. The total number of bits used to describe these fields is arbitrary. However, from a practical standpoint, each cell should contain the same number of bits throughout the memory array. In addition, with the presently available memory components, this number is best provided as a multiple of 4 or 8 bits. 16 bits may be chosen for each memory cell, 8 for the Data item and 3 for each Link. This leaves 2 bits for the Status Code. However this choice is arbitrary and other designs may use different numbers of bits for each of these fields (and indeed may require additional fields bits—cf. with a higher dimensional memory array).

An important aspect of the Associative Memory tree building process in systems in which each cell can be linked to any two of three or more neighbours is that whilst the memory contains only a few leggy tree structures then the CPU will have no difficulties in keeping to the mainly North-West to South-East and the North-East to South-West directions when building the trees (for the Right Links and Left Links respectively). However as the number and complexity of the memory's trees increases then at some stage the limbs of a new tree structure will run into those of an existing tree. It is at this point that the basic memory cells "degrees of freedom" come into play. The CPU searches these systematically, e.g. clockwise, until a free neighbouring cell is found, and then uses this free cell to avoid clashing with the existing tree structure.

However, even when seven degrees of freedom are provided as in one of the examples described above, as the trees become more numerous and complex a time will come when no free cell can be found when it is needed. Alternative strategies are then required.

If no free cell is found then either the existing tree can be reconstructed (as mentioned above using the Usage Count facility) or a new sub-tree can be created from this point with its tree root located on the topmost row or leftmost column of the memory array, and pointed to by an appropriate pointer string. Another strategy that can be used is to backtrack the tree to a point where free cells do exist and then to continue the construction from there. Which strategy is most appropriate at a particular time will depend upon the circumstances when the problem is encountered.

Ultimately the tree reconstruction strategy is the most powerful, but it suffers from the requirement that all the related trees may also need to be reconstructed at the same time, (since otherwise their pointer strings would not be valid). This can take a considerable time, during which period the computer is not available for any other processing tasks. Fortunately, experience shows that this is a relatively infrequent requirement. In addition the reconstructed trees have been found to take up less memory space than that required for the original trees, that is, the trees become more compact as a consequence of using an appropriate reconstruction algorithm.

The tree structures in the memory have a form and content that reflects the history of the activities that they have encountered. Because any tree can have items that refer to any other tree sub-structure, it is unwise to delete any tree structure unless it is known to be unneeded.

When reconstructing a complex tree there are a number of factors that have to be watched. First, it is likely that some pointer strings will exist in other trees which presume a particular sequence of cells in the tree being reconstructed. These pointer strings must therefore also be corrected when the tree is reconstructed.

Second, such reconstruction is aimed at improving the storage efficiency of the tree (and incidentally also improving its access efficiency). This requires that a value judgement is made of the existing tree structures. The Usage Count is a simple way of making this value judgement. Since the number of accesses of the sub-tree, from its start to its terminus, can be recorded in the Usage Count, this count value can be used throughout the tree to determine which sub-trees are most used. Reconstructing the tree on the basis of the most used sub-trees first, will result in a tree with more efficient accesses (providing the pattern of sub-tree usage remains similar). If a sub-tree is moved closer to the tree root, as a consequence of reconstruction, then the other items of that tree will also be moved. This provides means for more intrinsic associations to be made than was previously the case. The net effect of this is that the tree can usually be built from fewer memory cells during reconstruction, than was required before reconstruction started.

A method of tree reconstruction is for the CPU to trace through each limb of the tree in turn and to remember the Usage Counts found at each Terminus (together with the access route to that Terminus). Then it creates a new tree in the memory array using the existing tree as its input data, built in the order of the highest Usage Code sub-tree structures first. Once the new tree is complete then the pointer strings in all the memory's other trees (i.e. those which refer to the old tree), can be found and corrected to suit the new tree structures. Once this is complete the original tree can then be deleted, making is memory cells available for other trees to use.

The time required to carry out a tree reconstruction depends on the quantity of data in the tree and the number of changes made.

The means by which the CPU communicates with the computers' I/O peripherals makes use of the CPU's RAM-like dynamic registers. Here buffer stores are temporarily created through which the data passes between the peripheral devices and the associative memory array.

Information input to the computer from a peripheral is placed into the CPU's RAM buffer, under the control of its microprogram, in an entirely conventional manner. This information is then transferred from the buffer to the associative memory by the CPU, and is added to the existing trees structures by implicit association.

Similarly, when information from the associative memory is to be output to a peripheral, the CPU first traverses the trees and copies the required information into a RAM buffer. It then outputs the information from this buffer in a conventional way.

Whilst the quantity of information held in the associative memory remains acceptably small then the entire memory contents can be transferred to and from a backing store when it is required to turn the computers power off. However a time will occur when the quantity of information held in the associative memory is too large to conveniently be copied to and from a backing store. It then becomes necessary to always keep the associative memory powered up, or to use non-volatile devices for its construction.

An embodiment of the present invention will now be described, by way of example, with reference to the accompanying drawings, in which.

Figure 1:
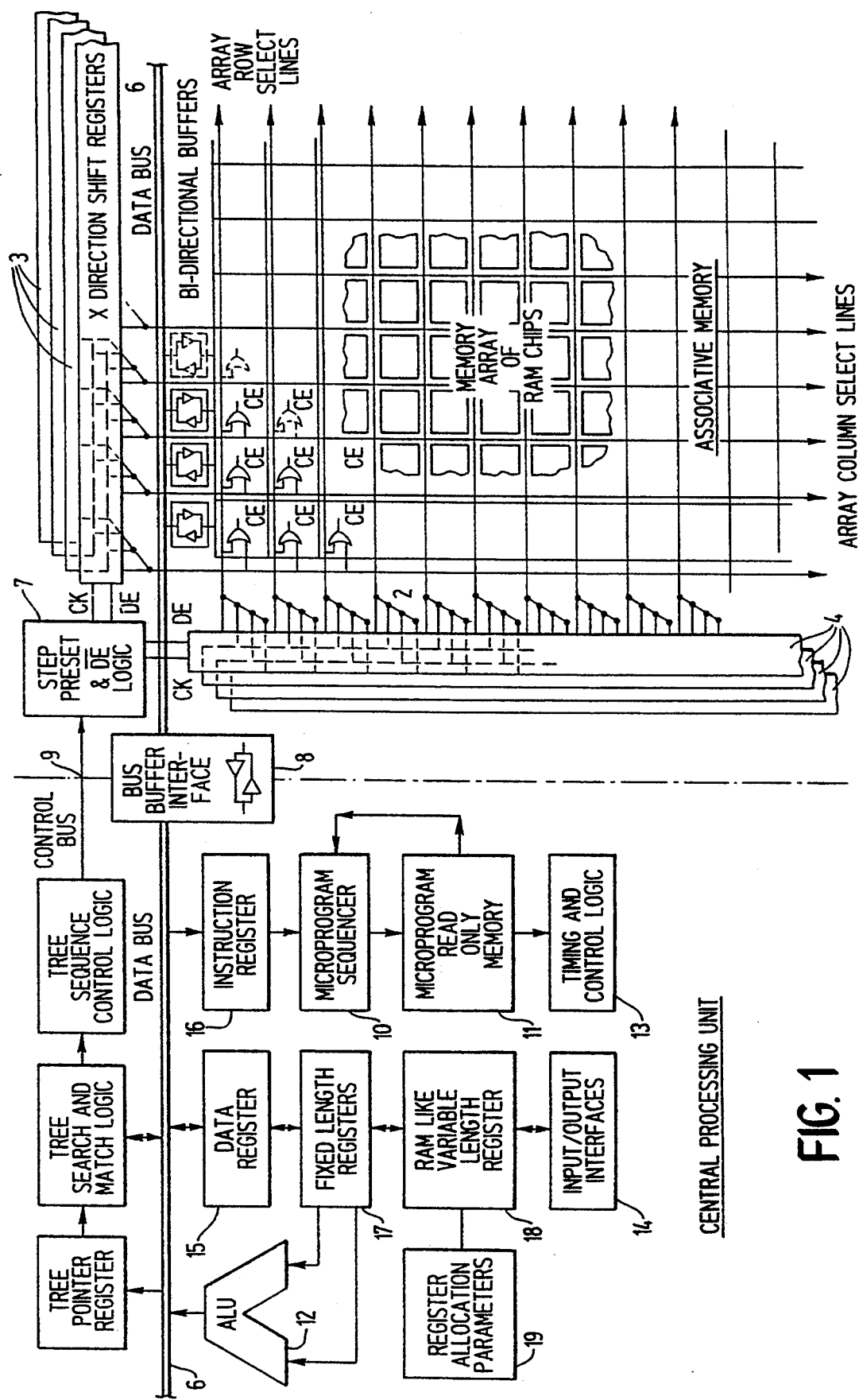
FIG. 1 is a block schematic diagram illustrating the structure of an associative memory computer in accordance with the present invention.
Figure 3A:
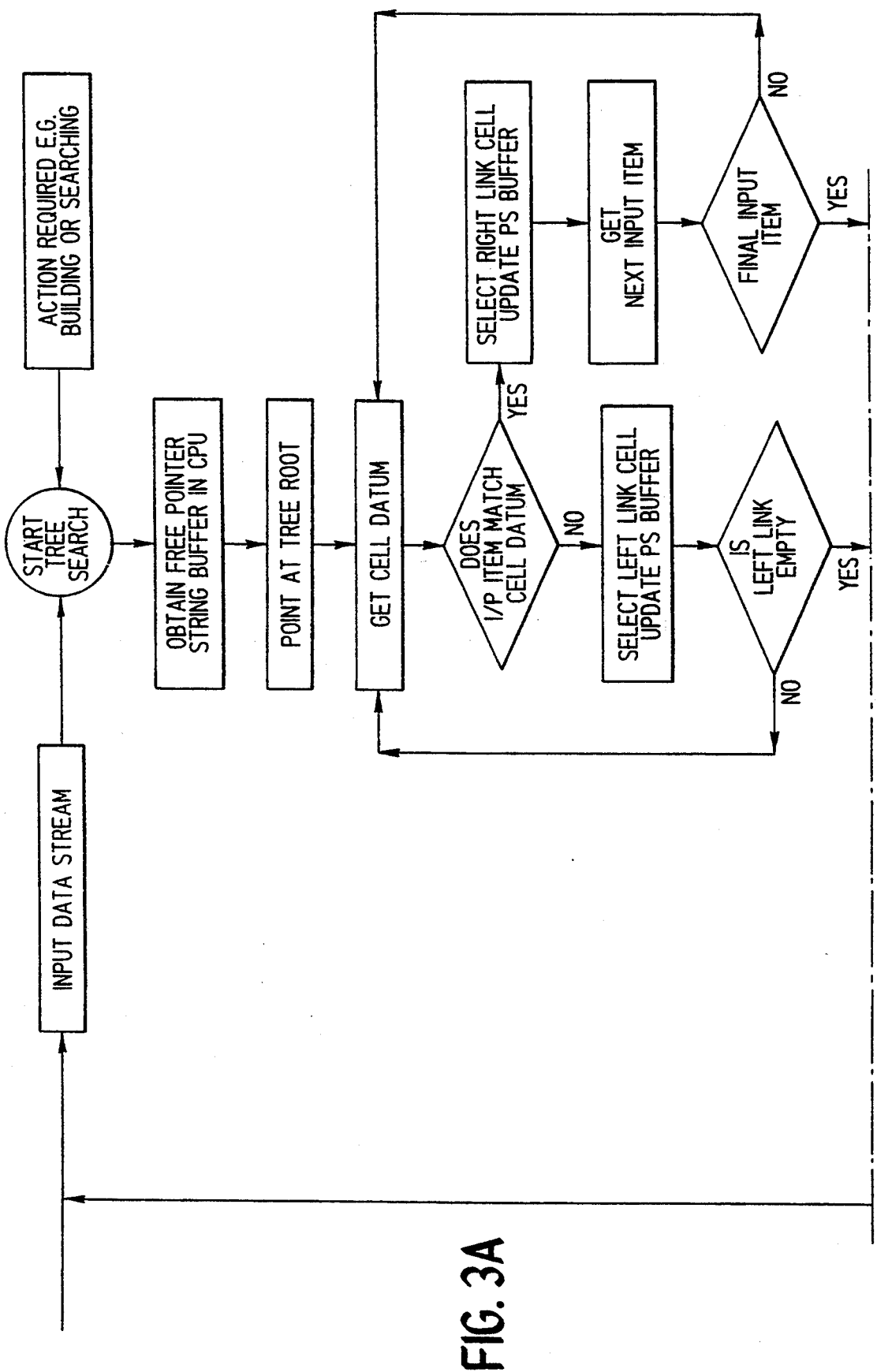
Figure 3B:
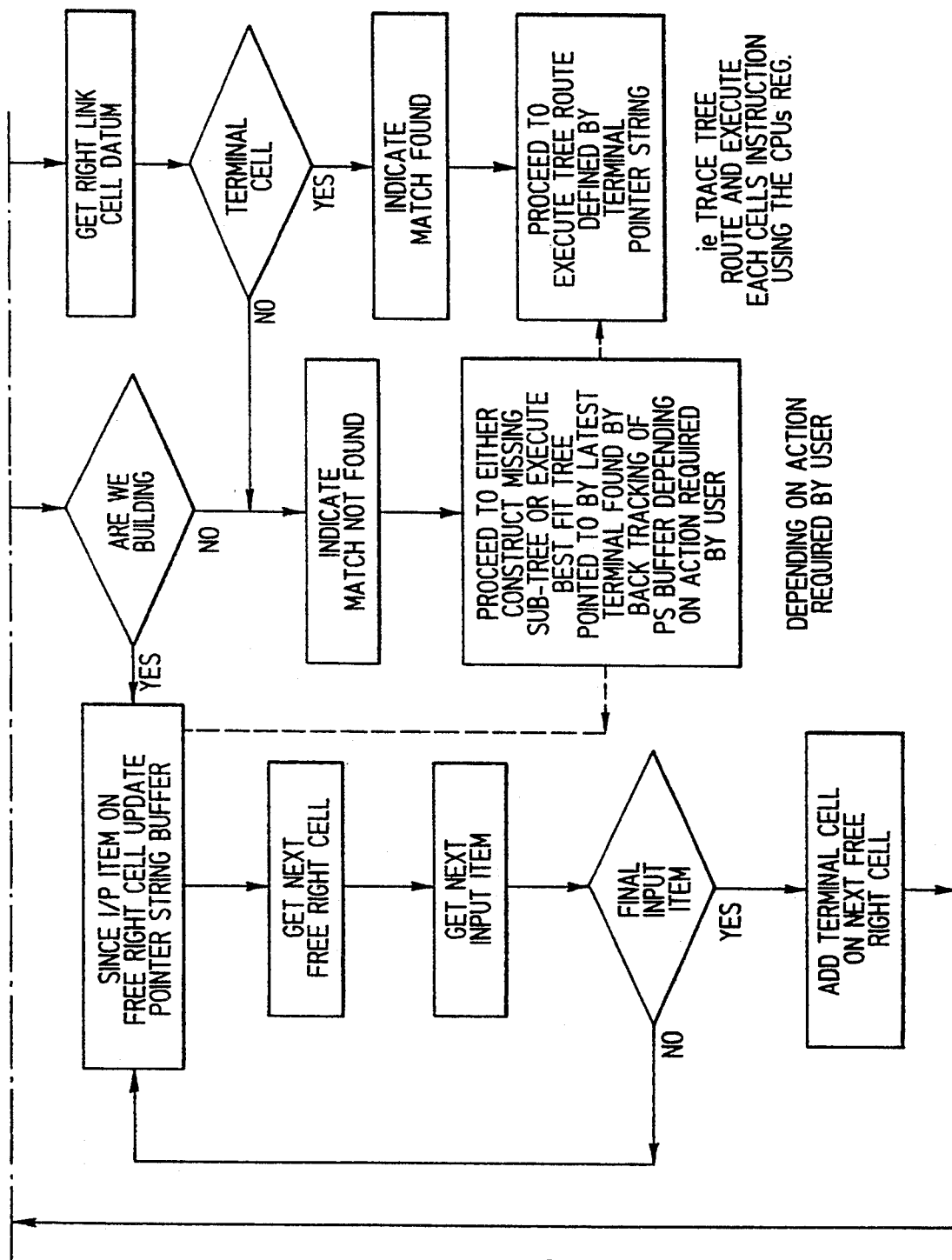
Figure 3C:
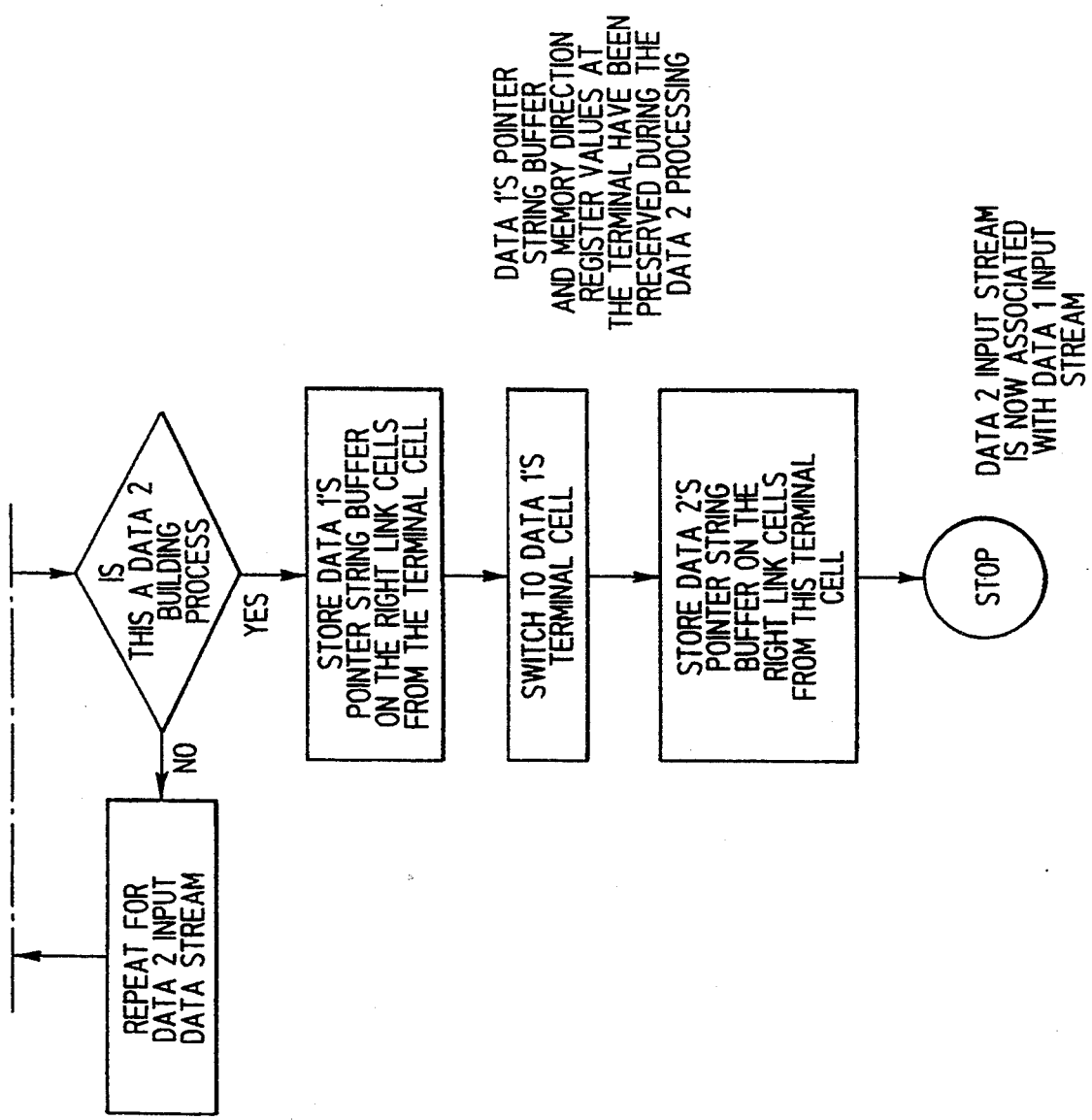
Figure 4A:
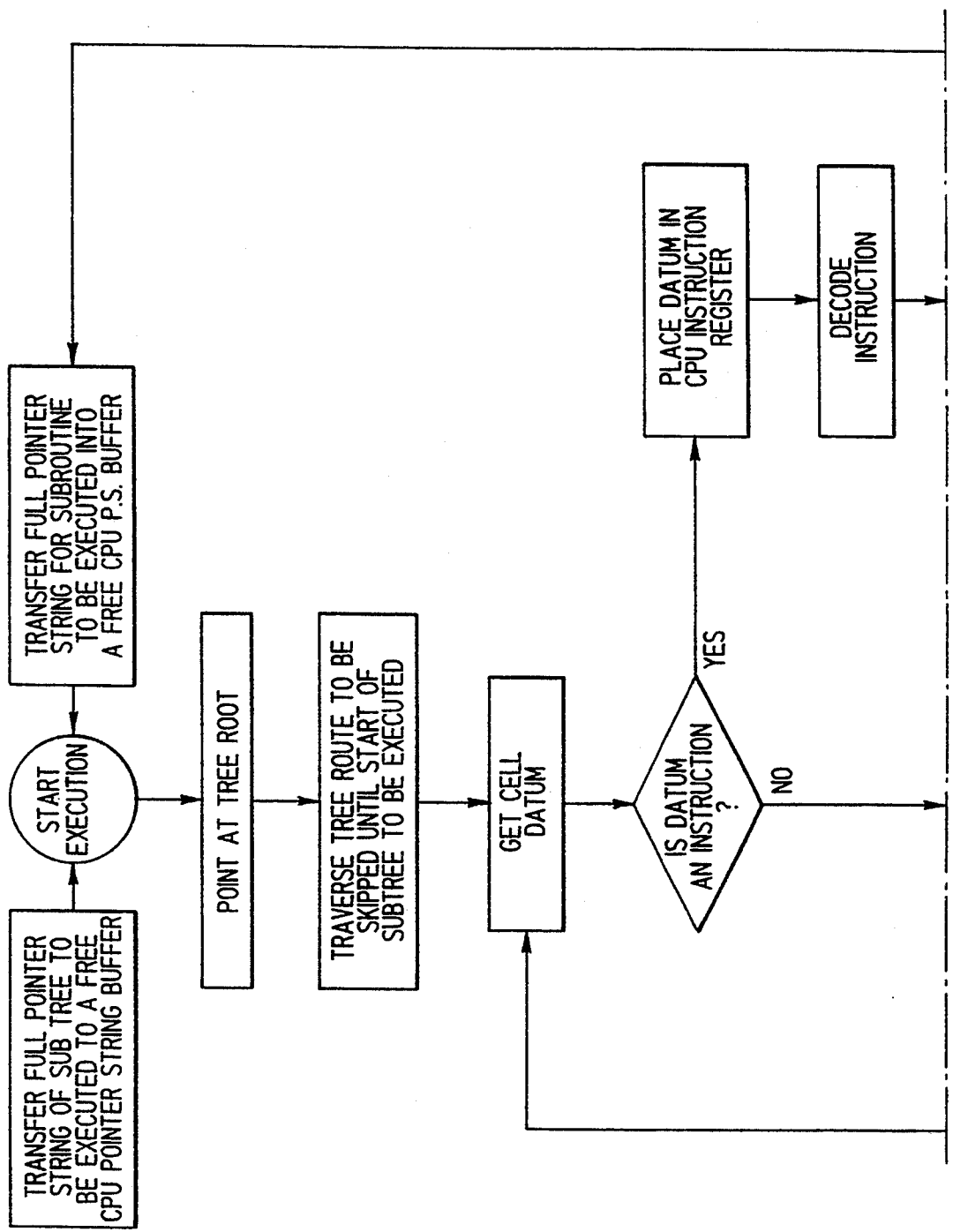
Figure 4C:
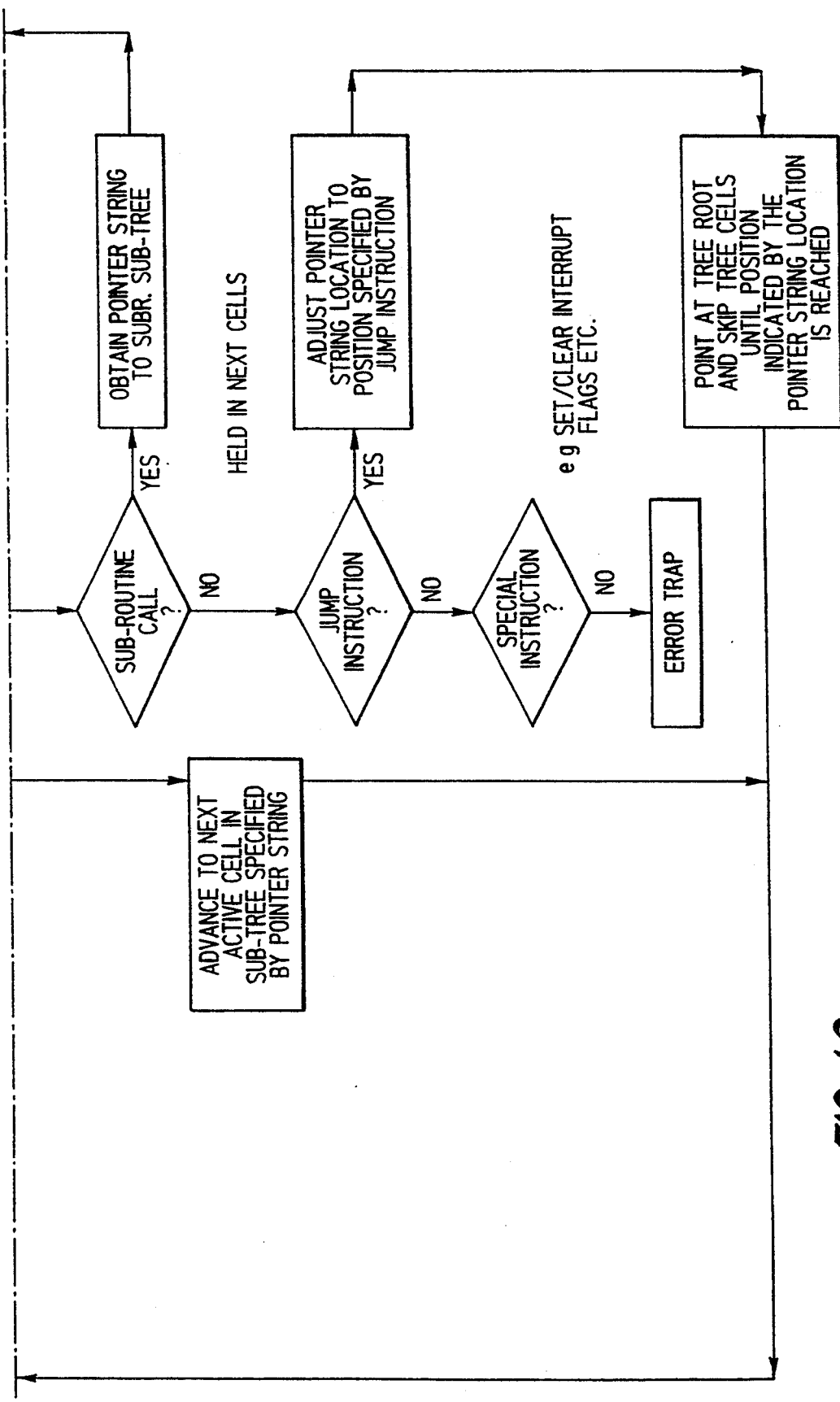

FIG. 3A to FIG. 3C comprise a flow chart illustrating the process by which data items are distributed and stored in the memory of the computer illustrated in FIG. 1; and FIG. 4A to FIG. 4C comprise is a flow chart illustrating the process by which data items are read from the memory of the computer illustrated in FIG. 1.

Referring to FIG. 1, the illustrated computer system comprises an associative memory formed from a two dimensional rectangular array of identical RAM cells 1 each of which is intended to store a respective data item, two relative addresses (Left link and Right link), and a status code as described above. Each cell 1 thus defines a respective memory cell. In a purpose built arrangement each RAM cell 1 can be defined by an appropriate formation in a customised chip. It is possible however to build an operating device using conventional RAM chips each of which is capable of storing many more data items than is required for an individual cell. Such an arrangement of conventional chips would require an address bus/microprogram link. Within each chip, the addressing is as described below, but using microprogram manipulations of the addresses rather than just the "chip select" mechanisms shown in FIG. 1.

Each cell 1 can be accessed via a respective gate 2 by any one of an array of four column select (X direction) shift registers 3 in combination with any one of an array of four row select (Y direction) shift registers 4. Data is written to and read from the memory cells via bi-directional buffers 5 and a data bus 6. The shift registers each receive clock and output enable inputs from a logic circuit 7. Thus the position of the active bit in each of the array of X and Y shift registers to be used for accessing a particular cell can be adjusted as necessary and the cell can then be selected in response to the output enable signal.

Only one pair of X and Y registers can access the memory at any one instant in time, but the system can switch between pairs of X and Y registers.

The data bus 6 communicates with a CPU via a bus buffer interface 8, and the logic circuit 7 communicates with the CPU via a control bus 9.

The CPU comprises a range of elements common to conventional computer systems but operating in a novel manner. The CPU activities related to the operation of the memory are carried out by a microprogram sequencer 10 linked to a microprogram read only memory 11. Instructions are executed in a conventional manner using an arithmetical logic unit 12, timing and control logic 13, and input/output interfaces 14. Data and instructions are loaded from the bus 6 into respective registers 15 and 16. Fixed length dedicated registers 17 are directly controlled by the microcode, and variable length registers 18 are accessed both directly and indirectly by the microcode. The register 18 operates in accordance with predetemined register allocation parameters from a store 19. The registers 18 are similar to RAM-type memory and are used dynamically by the CPU to create, hold and process all variable length register items required during the CPU's operation, e.g. the pointer strings stored in terminus cells.

The CPU also comprises a tree pointer register 20, tree search and match logic 21, and tree sequence control logic 22 connected to the control bus 9. These components of the CPU control the distribution of sets of data items in the memory cells 1 as described below with reference to FIGS. 2 to 4.

Figure 2:
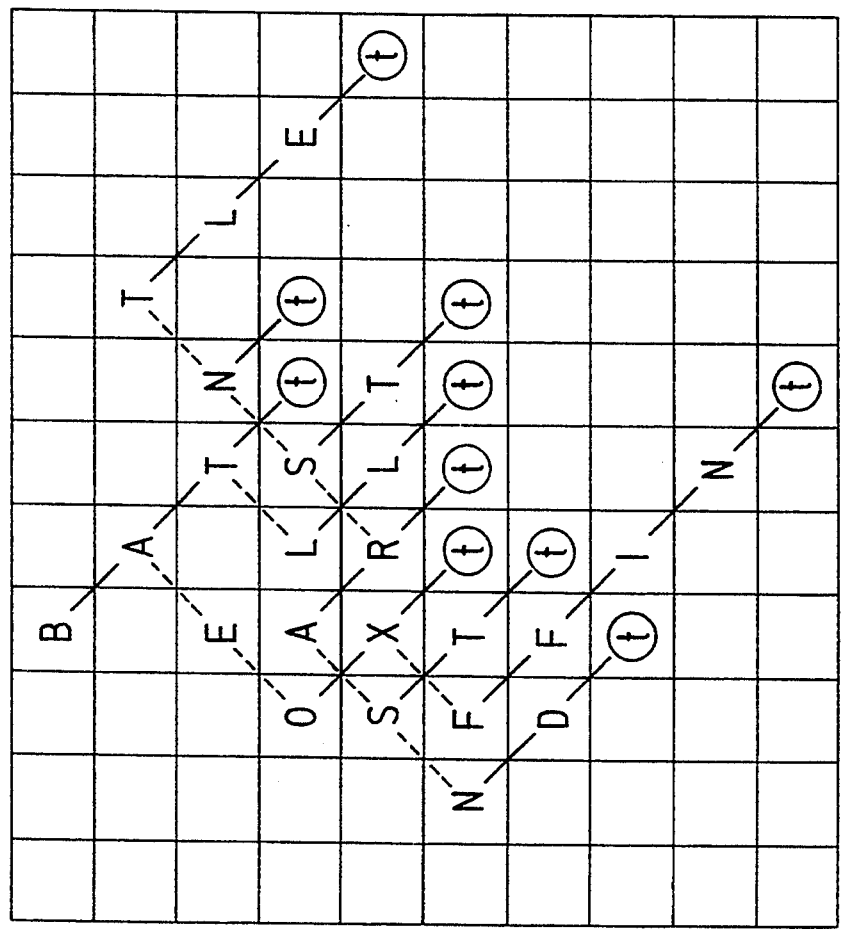
FIG. 2 is a graphical representation of the distribution of data items in a memory array of the computer illustrated in FIG. 1.

Referring to FIG. 2, this illustrates the distribution of sets of data items representative of the following words:

| | |
|---|---|
| BAT | BEST |
| BALL | BEND |
| BEAR | BEAST |
| BOX | BEAN |
| BOFFIN | BEATLE |

It would be possible to store each of the letters of each word in a respective cell, but the illustrated approach utilises memory space more efficiently by storing only sufficient data items to distinguish different words. All words start from the same cell (the tree root occupied by letter B). Subsequent letters O are written to adjacent cells each of which cells is linked to two further cells by two relative addresses, the first relative addresses representing links (Right links) shown in FIG. 2 as full lines and the second relative addresses representing links (Left links) shown in FIG. 2 as broken lines. Each cell but the tree root is linked to a single cell from which it stems and two cells which stem from it. Generally Right links are in the direction North West to South East, and Left links are in the direction North East to South West, but as any two of seven cells can stem from any one cell these directions are not adhered to when the tree structure becomes congested. Going through each of the words in the above list in turn, the positioning of the individual letters is explained below, SE, S, SW, W, NW, N, NE and E representing the adjacent cell in the South East, South etc. directions.

BAT:
- B Goes to the tree root cell (Right link)
- A Goes to the vacant SE cell (Right link)
- T Goes to the vacant SE cell (Right link)
    - circled t (terminus cell) goes to the vacant SE cell (Right link)

The terminus cell stores a code identifying a string of data items to be associated with the word BAT, e.g. the French language translation of BAT. (In practice, more than one terminus cell may be required to store all the information needed to identify the set of data items. If so, a series of terminus cells, all interconnected by Right links only, can be used to provide the required storage. In the cases illustrated, each set has only one terminus cell.) The associated word is stored in a similar manner in another tree and allocated a terminus cell code identifying the word BAT. Simple Right links are indicated by binary "0", and thus the code for BAT is 0,0,0.

BALL:
- B Already in root cell
- A Already in SE cell
- L SE cell occupied, therefore put letter to SW (Left link) of SE cell
- L Put in SE cell (Right link)

Thus the code for BALL is 0,0,10,0. The code binary "1" is deemed to mean that when leaving one cell on its Right link you do not process the cell on that Right link but rather move to the next cell on its Left link.

BEAR:
- B Already in root cell
- E SE cell occupied, therefore put letter on Left link of SE cell
- A SE cell occupied by the letter L, so put A in S cell (this is the Right link (first relative address) of the cell storing the letter E)
- R Put in SE cell Thus the code for BEAR is 0,10,0,0.

BOX:
- B Already in root cell
- O SE cell occupied, as is Left link of SE cell. Therefore follow Left links from SE cell until a vacant cell or the letter O is found. Thus O goes to SW of the cell storing letter E
- X Put in SE cell Thus the code for BOX is 0,110,0.

The same conventions are applied to the remaining words such that their codes are as follows:

| | |
|---|---|
| BOFFIN | 0, 110, 10, 0, 0, 0 |// continued
| BEST | 0, 10, 10, 0 |
| BEND | 0, 10, 110, 0 |
| BEAST | 0, 10, 0, 10, 0 |
| BEAN | 0, 10, 0, 110 |
| BEATLE | 0, 10, 0, 1110, 0, 0 |

It can be seen that the letter S of BEAST occupies the last available space adjacent the cell storing the letter R. Paths can still be traced through the memory via the cell storing the letter R however by use of the Left links. Thus highly complex tree structures can be built up with each string of data items contributing to the tree being uniquely described by a binary code. Assuming that a separate tree of data is established storing the French translation of the word BEAST, the terminal cell of tree paths storing the translation would store the code or pointer string 0100100. Thus, on feeding in the French word, the system would search for that word in the "French" tree, read out the pointer string 0100100, go to the "English" tree, and read out the string of data items stored in the cells corresponding to 0100100. A simple dictionary function is thus obtained. Memory space is very efficiently used, and memory capacity is not limited by the capacity of a conventional address bus.

FIG. 3A-3C are a simplified illustration of a microprogram algorithm for effecting the tree building and searching routines described above. FIG. 4A-4C are is a simplified illustration of a program sub-tree execution algorithm. Although these illustrations do not deal explicitly with every logical possibility which has to be catered for, the illustrations do indicate the general outline of the required algorithms.

I claim:

1. In a system having a memory comprising a plurality of cells, a method for storing a first data series and a second data series and accessing the first data series in response to an input of the second data series, the first data series comprising a plurality of data items and the second data series comprising a plurality of data items including a last data item, the method comprising:

storing the first data series in the memory wherein at least one of the data items in the first data series is stored in a corresponding one of the cells together with a relative address identifying a cell in which a subsequent data item in the first data series is stored, whereby the first data series is stored in a series of cells defining a first route, generating a code describing the first route in terms of the relative addresses stored in the cells of the first route, storing the second data series in the memory wherein at least one of the data items in the second data series is stored in a corresponding one of the cells together with a relative address identifying a cell in which a subsequent data item in the second data series is stored, whereby the second data series is stored in a series of cells defining a second route, storing a further relative address in the cell in which the last data item of the second data series is stored, the further relative address identifying at least one further cell, storing the code describing the first route in the at least one further cell, searching the plurality of cells in response to the input of the second data series to locate the second route, reading the further relative address from the cell in which the last data item of the second data series is stored, reading the content of the at least one cell identified by the further relative address to obtain the code describing the first route; and reading the data stored in the cells identified by the code describing the first route to give access to the first data series.

2. The method of claim 1 wherein the first data series includes a last data item and further comprising:

generating a code describing the second route in terms of the relative addresses stored in the cells of the second route, storing a further relative address in the cell in which the last data item of the first data series is stored, the further relative address identifying at least one further cell, storing the code describing the second route in the at least one further cell, searching the plurality of cells in response to the input of the first data series to locate the first route, reading the further relative address from the cell in which the last data item of the first data series is stored, reading the content of the at least one cell identified by the further relative address to obtain the code describing the second route; and reading the data stored in the cells identified by the code describing the second route to give access to the second data series, whereby the second data series is accessed in response to an input of the first data series.

3. The method of claim 1, comprising:

storing the first and second data series in the memory wherein at least one of the data items in one of the series is stored in a corresponding one of the cells together with at least two relative addresses identifying two cells, a subsequent data item in the series being stored in at least one of the two cells, the subsequent data item having a storage location identified by one of the at least two relative addresses.

4. The method of claim 3, comprising:

arranging the memory in the form of a two dimensional array of cells, and providing each of the cells with N neighboring cells, any two of the N neighboring cells being identified by the at least two relative addresses, whereby if the nth data item in a series is written to a vacant cell, then the n−1 data item in the series occupies one of the N neighboring cells, and there are N−1 potentially available neighboring cells to which the n+1 data item in the series can be written.

5. The method of claim 4, wherein N is equal to eight.

6. A system for storing a first data series and a second data series and accessing the first data series in response to an input of the second data series, the first data series comprising a plurality of data items and the second data series comprising a plurality of data items including a last data item, the system comprising:

a memory comprising a plurality of cells, means for storing the first data series in the memory wherein at least one of the data items in the first data series is stored in a corresponding one of the cells together with a relative address identifying a cell in which a subsequent data item in the first data series is stored, whereby the first data series is stored in a series of cells defining a first route, means for generating a code describing the first route in terms of the relative addresses stored in the cells of the first route, means for storing the second data series in the memory wherein at least one of the data items in the second data series is stored in a corresponding one of the cells together with a relative address identifying a cell in which a subsequent data item in the second data series is stored, whereby the second data series is stored in a series of cells defining a second route, means for storing a further relative address in the cell in which the last data item of the second data series is stored, the further relative address identifying at least one further cell, means for storing the code describing the first route in the at least one further cell, means for searching the plurality of cells in response to the input of the second data series to locate the second route, means for reading the further relative address from the cell in which the last data item of the second data series is stored, means for reading the content of the at least one cell identified by the further relative address to obtain the code describing the first route; and means for reading the data stored in the cells identified by the code describing the first route to give access to the first data series.

7. The system of claim 6 wherein the first data series includes a last data item and further comprising:

means for generating a code describing the second route in terms of the relative addresses stored in the cells of the second route, means for storing a further relative address in the cell in which the last data item of the first data series is stored, the further relative address identifying at least one further cell, means for storing the code describing the second route in the at least one further cell, means for searching the plurality of cells in response to the input of the first data series to locate the first route, means for reading the further relative address from the cell in which the last data item of the first data series is stored, means for reading the content of the at least one cell identified by the further relative address to obtain the code describing the second route; and means for reading the data stored in the cells identified by the code describing the second route to give access to the second data series, means for whereby the second data series is accessed in response to an input of the first data series.

8. The system of claim 6, comprising:

means for storing the first and second data series in the memory in accordance with an algorithm such that at least one of the data items in one of the series is stored in a corresponding one of the cells together with at least two relative addresses identifying two cells, a subsequent data item in the series being stored in at least one of the two cells, the subsequent data item having a storage location identified by one of the at least two relative addresses.

9. The system of claim 8, comprising:

means for arranging the memory in the form of a two dimensional array of cells, and means for providing each of the cells with N neighboring cells, any two of the N neighboring cells being identified by the at least two relative addresses, whereby if the nth data item in a series is written to a vacant cell, then the n−1 data item in the series occupies one of the N neighboring cells, and there are N−1 potentially available neighboring cells to which the n+1 data item in the series can be written.

10. The system of claim 9, wherein N is equal to eight.

* * * * *